March 28, 1950  E. B. WAGNER  2,502,357
HYDRAULIC TRACK TOWER LIFT
Filed April 5, 1948  2 Sheets-Sheet 1
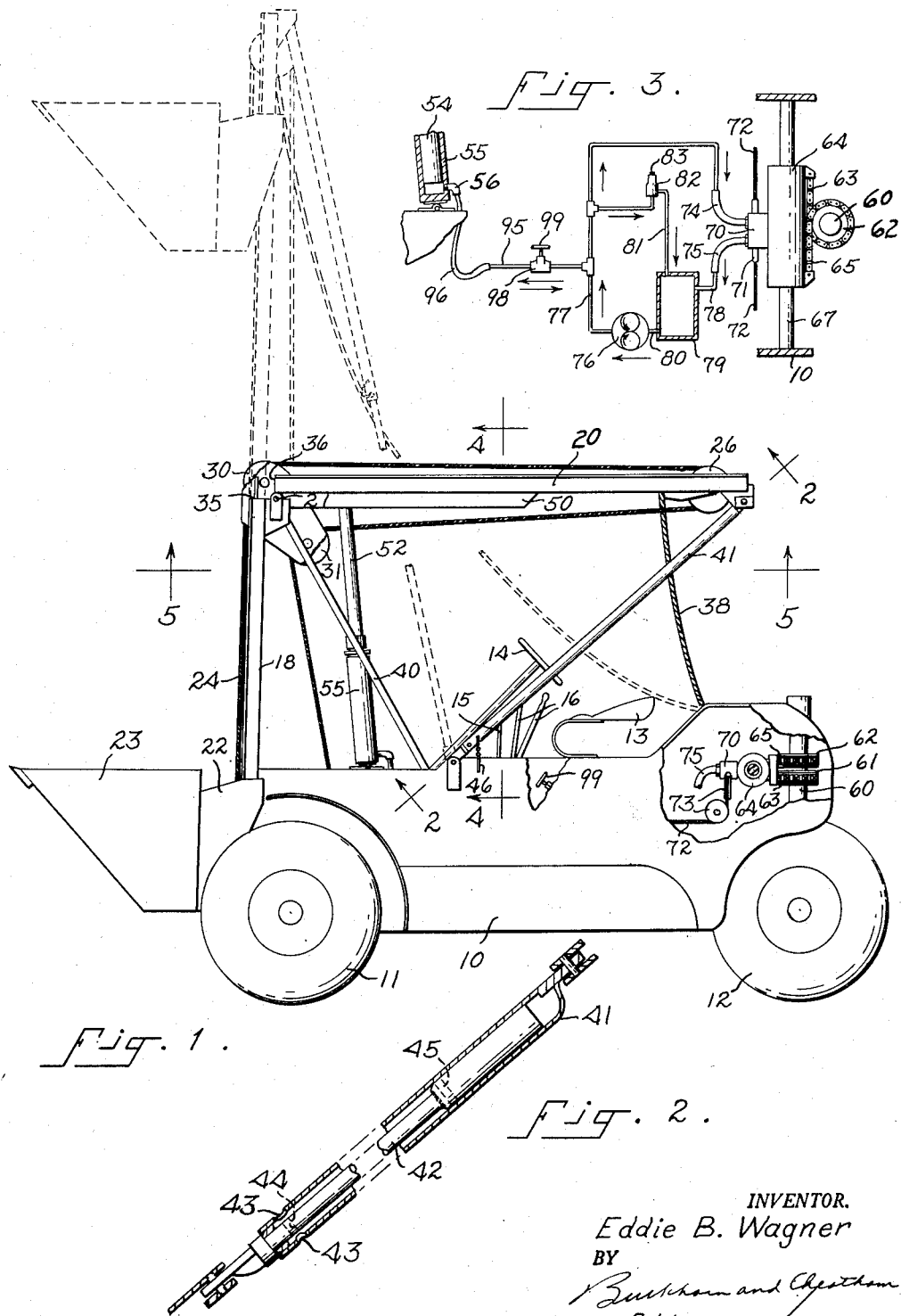
INVENTOR.
Eddie B. Wagner
BY
Buckham and Cheatham
Attorney March 28, 1950  E. B. WAGNER  2,502,357

HYDRAULIC TRACK TOWER LIFT

Filed April 5, 1948  2 Sheets-Sheet 2

INVENTOR.
Eddie B. Wagner
BY
Buckhorn and Cheatham
Attorney

Patented Mar. 28, 1950

2,502,357

UNITED STATES PATENT OFFICE 2,502,357

HYDRAULIC TRACK TOWER LIFT

Eddie B. Wagner, Portland, Oreg.

Application April 5, 1948, Serial No. 18,943

9 Claims. (Cl. 214—119)

My present invention concerns an industrial vehicle of the type having a tower upon which a material handling device may be raised and lowered, which tower includes a fixed section rising to a relatively low height and a collapsible extension which may be raised to form a continuation of the fixed section.

The principal object of my present invention is to provide a tower for a material handling device of two effective heights, one of them being relatively low so that the vehicle may pass under obstructions such as overhead bridges or through doorways, and the other being relatively high so that material may be lifted to considerable heights.

A further principal object of the present invention is to provide such a vehicle with means whereby the tower may be extended or lowered as desired without affecting the means for controlling the material handling device, so that a scoop, fork, bucket or platform may be raised and lowered or otherwise controlled upon the fixed lower section of the tower regardless of the position of the extension, and may also be raised and lowered or otherwise controlled along the full length of the tower when the extension is raised.

A further object of the present invention is to provide a vehicle of the class described in which means for raising and lowering the tower may be accomplished with a minimum of effort and in a minimum time. The foregoing object is accomplished by providing means coupled with the automotive engine of the vehicle which may be instantly thrown into or out of operation at the will of the operator of the vehicle.

A further object of the present invention is to provide an elevating servomotor for raising and lowering a tower extension on a vehicle having a servomotor steering mechanism, the elevating servomotor being connected to the same pump which operates the steering servomotor and being readily controllable by the operator of the vehicle.

The present invention is shown in connection with a vehicle such as disclosed in the patent to Harold A. Wagner et al., No. 2,386,510, dated October 9, 1945, as improved in the copending application of myself and Harold A. Wagner, Serial No. 716,696, filed December 17, 1946. It is to be appreciated, however, that the invention may be incorporated in any type of vehicle having a tower, such as the type disclosed and claimed in the patent to Harold A. Wagner et al., No. 2,327,476, dated August 24, 1943.

The foregoing and other objects and advantages of the present invention will be more readily ascertained from inspection of the following specification taken in connection with the accompanying drawings wherein like numerals refer to like parts throughout, while the features of novelty will be more distinctly pointed out in the appended claims.

In the drawings

Fig. 1 is a side elevation of an industrial vehicle embodying the present invention, showing the tower extension in lowered position in full line and in elevated position in dash lines;

Fig. 2 is a section of a detail drawn to an enlarged scale and taken substantially along line 2—2 of Fig. 1;

Fig. 3 is a schematic diagram of the hydraulic operating system;

Figure 5:
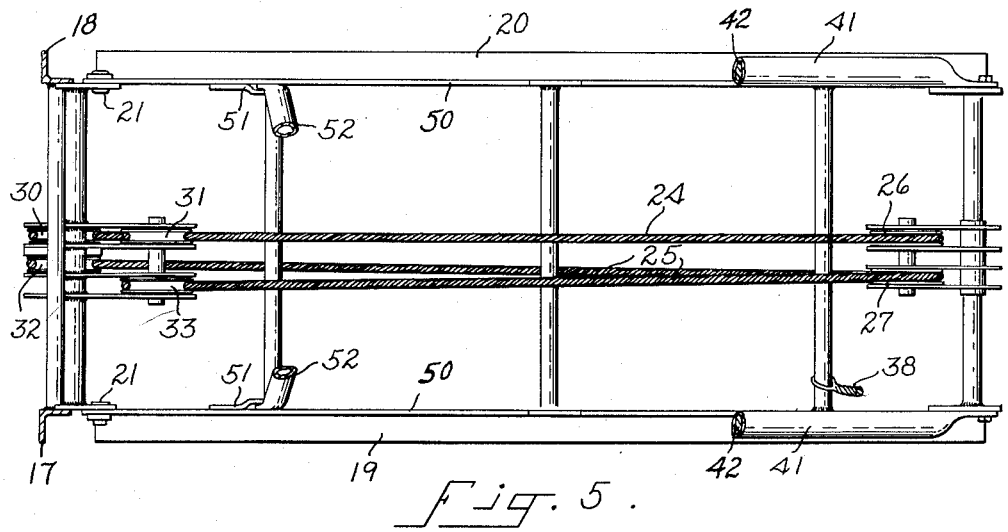
Fig. 5 is a horizontal section, looking upward, taken from line 5—5 of Fig. 1.

The present invention is shown incorporated in an industrial vehicle comprising a chassis 10 of the tricycle type having front drive wheels 11 and a single rear tiller wheel 12. The chassis houses an automotive engine (not shown) by means of which the front wheels may be driven to propel the vehicle from place to place. A driver's seat 13 is positioned on the chassis in correct relation to a steering wheel 14, brake lever 15 and control levers 16. The vehicle is provided with a fixed tower section including a pair of spaced, vertical tracks 17 and 18, one at each front corner of the vehicle, which together form the fixed lower portion of the tower. A pair of spaced tracks 19 and 20, which together form a movable extension of the tower, are pivoted to the fixed track sections by a pivot comprising the pins 21. The track extension may rest in non-operative position extending rearwardly over the top of the vehicle or may be raised to an operating position in alignment with the fixed section. A carriage 22, as illustrated and described in the aforesaid application, Serial No. 716,696, is guided by the track sections of the tower for vertical movement along the tower, and supports a movable material handling device 23 which may be swung from an upright material holding position, as illustrated, to a forwardly inclined scooping or dumping position, as fully detailed in the aforesaid application. A pair of flexible control cables 24 and 25 are fixed to the carriage or the material handling device, pass upwardly about guide pulleys 26 and 27, respectively, at the top of the tower extension, then downward into the chassis at a point slightly spaced rearwardly from the front end thereof, the cables being associated within the chassis with control drums connected to the engine and manipulated by the operator under control of the control levers 16, as illustrated and described in the aforesaid application.

The cable 24 passes about a guide pulley 30 mounted outside of and above the pivot 21 so that the rim of the pulley extends forwardly and outside of the angle formed between the fixed section and tower extension when the tower is lowered, then passes upwardly about the pulley 26. The return flight of cable 24 passes downwardly closely adjacent the rear surface of the tower extension and about a pulley 31 mounted in the angle formed by the tower extension and fixed section. The cable 25 similarly passes about a pulley 32 coaxially located with pulley 30, and a pulley 33 coaxially located with pulley 31. Therefore, regardless of the position of the tower extension, the carriage 22 and scoop 23 may be controlled not only to move up and down along the lower tower section or the extension when raised, but also to pivot from its holding position to its dumping or scooping position.

The pivot 21 is offset inwardly of the tower, and the fixed section and tower extension have abutting end portions 35 and 36, respectively, located outside of the pivot, which come together when the tower is raised so as to limit raising movement thereof to vertical alignment. The tower therefore is substantially self-supporting when raised, particularly since the overhanging weight of the material handling device and of any material therein tends to pull the tower extension forwardly. In order for the tower extension to be lowered, the extension must be first pulled rearwardly until the weight thereof has passed beyond a vertical line through the pivot 21, and for this reason a rope 38 extends from a point adjacent the driving seat to the top of the tower. The lower fixed section is braced by fixed braces 40 extending diagonally upward from an intermediate portion of the chassis, and the extension is preferably braced by a pair of telescoping braces, each comprising a pair of telescoping members, in this instance a cylinder 41 pivoted to the top of the extension and a pistonlike telescoping member 42 pivoted to an intermediate portion of the chassis. The cylinder is provided with a pair of aligned openings 43 at its lower end, and the rod 42 is provided with a transverse opening 44 adjacent its lower end and a second opening 45 adjacent its upper end. A locking pin 46 is mounted on a short length of chain at the lower end of the cylinder and may be passed through the opening 43 and either of the openings 44 and 45 when aligned with the opening 43 to lock the extension in elevated or lowered position. The pistonhead of member 42 loosely fits the cylinder and permits relatively rapid escape of air thereby, but not too rapidly so that the telescoping members act as a dashpot device to prevent the extension from forcibly dropping when lowered. The telescoping braces may be omitted, especially if the extension is relatively short.

The tower extension guides 19 and 20 preferably comprise angle bars, and extension flanges 50 are welded to the inwardly extending legs thereof to provide means for cooperation with the pivot 21. The flanges 50 also provide means for attachment of pivot brackets 51, each of which pivotally retains the end of one arm of a U-shaped member including uprights 52 and a crosshead 53 attached to the upper end of a piston 54. The piston 54 extends into a cylinder 55 pivotally mounted at its lower end on a central forward portion of the chassis 10, the piston and cylinder comprising a servomotor for elevating the track extension. When fluid is admitted to the cylinder 55 through an elbow connection 56 at the lower end thereof, the track extension is raised, and when fluid is permitted to escape after the tower has been pulled off center rearwardly the weight of the tower will cause the piston 54 to descend into the cylinder and permit the tower extension to be lowered.

In order to steer the vehicle, the tiller wheel 12 is mounted upon a vertical post 60 rotatably journalled in the rear end of the vehicle. The post 60 has a pair of sprocket gears 61 and 62 fixed thereto, one slightly above the other. A sprocket chain 63 passes partially about the gear 61 and is pinned to one end of a steering cylinder 64. A sprocket chain 65 passes about gear 62 in the opposite direction and is attached to the opposite end of cylinder 64. Cylinder 64 houses a piston 66 fixed to the central portion of a fixed pistonrod 67 extending transversely of the chassis and providing a support for the cylinder. If fluid is admitted to one end of the cylinder and permitted to escape from the opposite end thereof, the cylinder will move relative to piston 66 in the direction toward the end into which fluid is being admitted, thus causing rotation of the steering post 60 and movement of the tiller wheel 12. The piston 66 and cylinder 64 constitute a steering servomotor.

In order to control the movement of the cylinder 64 a valve 70 is mounted upon the cylinder wall, the valve including a valvestem 71 having a cable 72 extending from each end thereof. The cables 72 pass about guide pulleys 73 and forwardly into engagement with the lower end of the shaft of the steering wheel 14 through suitable connections (not shown) whereby rotation of the steering wheel 14 moves the valvestem 71 in either direction. Fluid is admitted to the interior of the valve 70 through a flexible hose connection 74 and passes therefrom through a flexible hose connection 75 so that movement of the cylinder 64 and the attached valve 70 is permitted.

Fluid is supplied to and withdrawn from the cylinder through a closed circuit conduit in which a gear pump 76, suitably connected to the engine, is incorporated. The pump 76 forces fluid through a tube 77 connected to flexible tube 74, and the circuit is completed by a tube 78 leading to the top of a supply tank 79 and a suction tube 80 leading from the bottom of the tank to the pump. A branch conduit 81 leads from outlet tube 77 to the top of tank 79 through a pressure relief valve 82 which is supplied with an adjusting member 83. Details of the relief valve are not shown, as many such devices are known to all skilled in the art. The adjusting device 83 is set to permit opening of the valve 82 when the outlet pressure builds up to a high limit. The valve 82 will remain closed as long as resistance to fluid flow is only that which would be imposed thereon by the effort of turning the tiller wheel 12, or if the valve 70 is open. Therefore, fluid will flow in a continuous manner as long as valve 70 is opened, will be sidetracked into one or the other end of cylinder 64 when valvestem 71 is moved in either direction, and will flow through bypass 81 when the cylinder 64 has reached the limit of its movement.

Figures 4, 6:
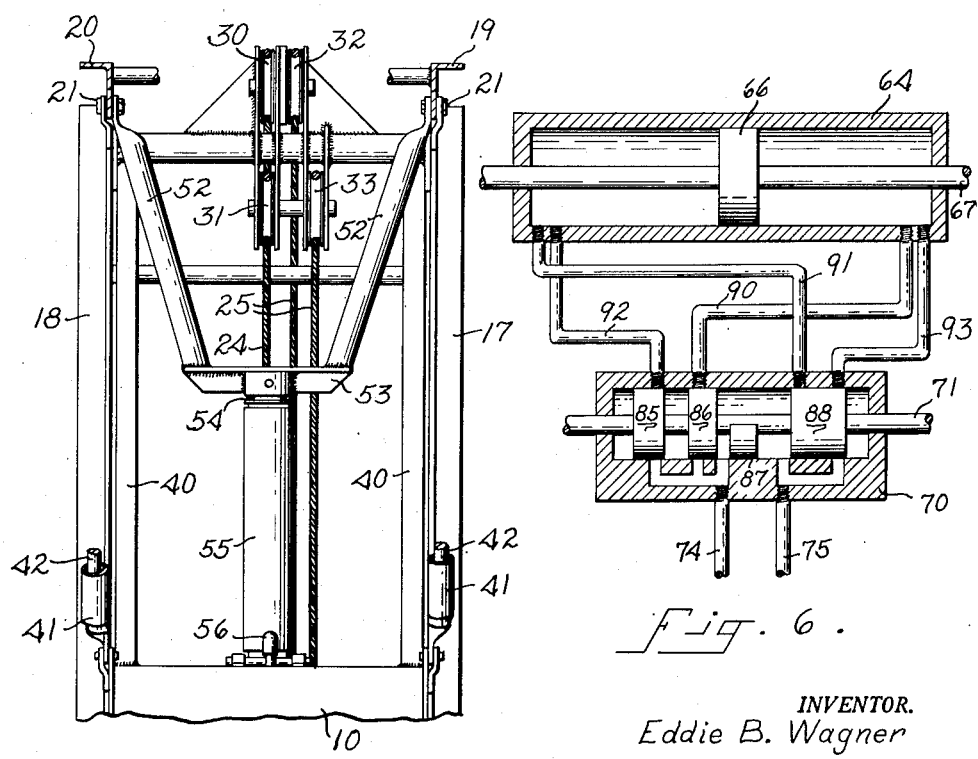
Fig. 4 is a vertical section taken substantially along line 4—4 of Fig. 1.
Fig. 6 is a schematic representation of the steering servomotor and control valve therefor.

A schematic representation of a form of control valve is illustrated in Fig. 6 wherein it is seen that valvestem 71 is provided with a first land 85, a second land 86, a third partial land 87, and a fourth land 88. The lands 85 and 88 are spaced from the ends of the valve so that the valvestem may be moved slightly in either direction. The valve is illustrated in neutral, in which position land 87 is located between the inlet from tube 74 and the outlet to tube 75 so that fluid passes freely through the center of the valve and back to the tank 79. Land 85, when moved to the right, covers the normal inlet and uncovers a branch inlet leading to a passage 90 going to the right end of cylinder 64. At the same time, land 88 uncovers a return passage 91 leading from the left end of cylinder 64. When valvestem 71 is moved toward the left, lands 87 and 86 block their respective passages and land 85 uncovers a passage 92 leading to the left end of cylinder 64, while land 88 uncovers a return passage 93 leading from the right end of cylinder 64. Thus, slight movement of the valvestem 71 in either direction blocks normal flow through valve 70 and causes fluid to exert pressure against either side of the piston 66, movement of cylinder 64 being permitted by drainage from the opposite side of the piston. Since the valve body 70 is attached to the cylinder 64, the valve body 70 immediately starts to move with the cylinder and tends to close the opened passages unless the valvestem 71 is continuously moved by continuously turning the steering wheel 14. When the tiller wheel has been turned to the desired extent, the operator arrests movement of the steering wheel 14, whereupon the valvestem 71 comes to rest and the cylinder 64 stops as soon as the respective passages thereto are closed and the fluid flows through the valve body.

In order to provide means for serving the elevating servomotor without adding extra equipment to the vehicle, a branch conduit 95 extends from the outlet conduit 77 to the bottom of cylinder 55, being connected therewith through a flexible tube 96 and the elbow 56. A needle valve 98 is imposed in the branch conduit 95 and is controlled by a manual valve handle 99 which is located adjacent the driver's seat 13 in the depression into which the control levers 16 extend and in which the driver's feet would be positioned. When it is desired to raise the extension, the operator turns the steering wheel 14 to the limit permitted, thus shifting the cylinder 64 to its permissible limit. As soon as this occurs, the valvestem 71 will be held tightly against either end of the valve body 70 and fluid flow will be blocked in the normal circuit since the cylinder 64 will have been moved to the limit of its possible movement in either direction. The pressure relief valve 82 will open at this point, but the pressure relief valve is so set that if the needle valve 98 is open the force of the fluid is capable of extending piston 54 to raise the tower extension. As soon as the tower extension has reached its limit of movement, fluid will also be prevented from flowing through branch conduit 95 and the pressure relief valve will open to cause continuous flow through the relief passage 81. The operator may now lock the piston in extended position by closing the needle valve 98. When it is desired to lower the tower extension, the needle valve 99 is opened and valve body 70 is placed in neutral so that the only resistance against lowering the piston 54 will be the frictional resistance of the conduits. The tower will remain upright, even though the telescoping brace is unlocked, until the operator pulls rearwardly upon rope 38 sufficiently to bring the tower extension off center to the rear of pivot 21. The weight of the tower will now cause the elevating servomotor to be collapsed. The speed of collapsing movement may be controlled by regulation of the needle valve 98. The needle valve 98 may be closed to prevent accidental raising of the tower extension when not desired while the vehicle is moving about.

In using the present invention a great saving of time and effort is accomplished. Often it is necessary to transport materials under low obstructions, but the materials must be released from the material handling device at a high elevation. For example, in concrete construction work the scoop 23 may receive concrete at one point and be required to pass under scaffolding on its way to a dumping point where the material must be dumped into a trough or form at a high elevation. The operator may accomplish the raising and lowering of the tower at the dumping point in a few seconds with a minimum of effort. The unloading of freight cars and the movement of materials about manufacturing plants is greatly facilitated. Farm labor may be reduced, as for example in moving hay through a barn door and piling the hay upon a balcony hayloft within the barn.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In an industrial vehicle having a tower thereon including a fixed section and an extension pivoted thereto and movable from a raised position in alignment therewith to a lowered position extending over the top of the vehicle, an elevating servomotor for raising said extension, a constantly operating pump, a steering servomotor served by said pump, a closed circuit conduit leading from and to said pump including a valve for controlling said steering servomotor, said valve having a neutral position at which said closed circuit conduit circulates fluid from and to said pump and opposed operating positions for operating said steering servomotor in either of which the output of said pump is prevented from returning thereto, a steering device connected to said valve for controlling the position thereof, a branch conduit connecting said closed circuit conduit with said elevating servomotor, and a pressure relief bypass valve set to open and cause the output of said pump to bypass said steering servomotor valve when said steering servomotor has reached a limit of movement in either direction.

2. In an industrial vehicle having a tower thereon including a fixed section and an extension pivoted thereto and movable from a raised position in alignment therewith to a lowered position extending over the top of the vehicle, a constantly operating pump, a steering servomotor served by said pump, a closed circuit conduit leading from and to said pump including a valve for controlling said servomotor, said valve having a neutral position at which said closed circuit conduit circulates fluid from and to said pump and opposed operating positions for operating said steeding servomotor in either of which the output of said pump is prevented from returning thereto, a steering device connected to said valve for controlling the position thereof, and a pressure relief bypass valve set to open and cause the output of said pump to bypass said steering servomotor valve when said steering servomotor has reached a limit of movement in either direction.

3. In an industrial vehicle having a tower pivoted thereon and movable from a raised vertical position to a lowered horizontal position, an elevating servomotor for raising said extension, a constantly operating pump, a steering servomotor served by said pump, a closed circuit conduit leading from and to said pump including a valve for controlling said servomotor, said valve having a neutral position at which said closed circuit conduit circulates fluid from and to said pump and opposed operating positions for operating said steering servomotor in either of which the output of said pump is prevented from returning thereto, a branch conduit connecting said closed circuit conduit with said elevating servomotor, a steering device connected to said valve for controlling the position thereof, and a manual valve in said branch conduit whereby said elevating servomotor may be locked in elevating position.

4. In an industrial vehicle having a tower pivoted thereon and movable from a raised vertical position to a lowered horizontal position, an elevating servomotor for raising said extension, a constantly operating pump, a steering servomotor served by said pump, a closed circuit conduit leading from and to said pump including a valve for controlling said servomotor, said valve having a neutral position at which said closed circuit conduit circulates fluid from and to said pump and opposed operating positions for operating said steering servomotor in either of which the output of said pump is prevented from returning thereto, a branch conduit connecting said closed circuit conduit with said elevating servomotor, a steering device connected to said valve for controlling the position thereof, and a manual valve in said branch conduit whereby said elevating servomotor may be locked in elevating position, said manual valve being movable to a regulatable extent to control the passage of fluid therethrough whereby said elevating servomotor may be returned to lower said tower at a regulatable speed when said manual valve is open and said servomotor valve is also open so that the pump is operating against negligible pressure.

5. In an industrial vehicle having a tower thereon including a fixed section and an extension pivoted thereto and movable from a raised position in alignment therewith to a lowered position extending over the top of the vehicle, an elevating servomotor for raising said extension, a constantly operating pump, a steering servomotor served by said pump, a closed circuit conduit leading from and to said pump including a valve for controlling said servomotor, said valve having a neutral position at which said closed circuit conduit circulates fluid from and to said pump and opposed operating positions for operating said steering servomotor in either of which the output of said pump is prevented from returning thereto, a branch conduit connecting said closed circuit conduit with said elevating servomotor, a steering device connected to said valve for controlling the position thereof, a manual valve in said branch conduit whereby said elevating servomotor may be locked in elevating position, said manual valve being movable to a regulatable extent to control the passage of fluid thereto whereby said elevating servomotor may be returned to lower said tower at a regulatable speed when said manual valve is open and said servomotor valve is also open so that the pump is operating against negligible pressure, and a bypass valve permitting return of fluid to said pump when both said closed circuit and said branch conduit are closed to the passage of fluid therethrough.

6. An industrial vehicle comprising a tower, a carriage guided by said tower, a material handling device mounted upon said carriage, said tower comprising a lower section fixed to the vehicle and an upper extension, pivot means attaching said upper extension to said lower section whereby said upper extension may be swung from a raised position in alignment with said lower section to a lowered position disposed above said vehicle, power means for raising and lowering said extension, a pair of flexible control cables, one connected to said carriage and the other connected to said material handling device and each extending about the free end of said extension and thence back to said vehicle, a pair of pulleys at the free end of said extension about which said cables pass, means on said vehicle for taking up or paying out said cables independently of each other whereby to raise and lower said carriage and to control the operation of said material handling device, and a pair of guide pulleys for each of said cables, one of each pair being mounted inside of and below said pivot means and the other of each pair being mounted outside of and above said pivot means whereby said carriage may be raised and lowered along said lower section alone or said extension alone when said extension is out of alignment with said lower section and may be raised and lowered along the entire tower when said extension is in alignment with said lower section, and whereby said material handling device may be controlled when said carriage is at any position upon said tower regardless of the position of said extension relative to said lower section.

7. The structure set forth in claim 6 in which said power means on said vehicle for raising and lowering said extension comprises a pair of telescoping members, one of said members being pivotally attached to the chassis of the vehicle and the other being pivotally attached to an intermediate portion of said extension, and means to extend or retract one of said members with respect to the other, and in which said pivot means is off-center of the tower on the side away from said device and said lower section and extension having abutting portions on the side of the tower toward said device to limit swinging movement of said extension when raised by said power means.

8. The structure set forth in claim 6 in which said pivot means is off-center of the tower on the side away from said device and said lower section and extension having abutting portions on the side of the tower toward said device to limit swinging movement of said extension when raised.

9. The construction set forth in claim 6 in combination with a telescoping brace pivotally attached to an upper part of said extension and to the chassis of the vehicle, comprising a cylinder and a piston, said piston loosely fitting said cylinder whereby said brace acts as a dashpot device to prevent rapid lowering of said extension.

EDDIE B. WAGNER.

REFERENCES CITED

The following references are of record in the file of this patent:

UNITED STATES PATENTS

| Number | Name | Date |
|---|---|---|
| 1,912,816 | Anthony | June 6, 1933 |
| 2,183,867 | Johansen | Dec. 19, 1939 |
| 2,320,600 | Howell | June 1, 1943 |
| 2,375,337 | Wilson | May 8, 1945 |

FOREIGN PATENTS

| Number | Country | Date |
|---|---|---|
| 327,795 | Great Britain | Apr. 17, 1930 |